United States Patent [19]

Perry

[11] 4,159,528

[45] Jun. 26, 1979

[54] PARALLEL TRANSFER ANALYZER FOR PERFORMING THE CHIRP Z TRANSFORM

[75] Inventor: Richard P. Perry, Haddon Heights, N.J.

[73] Assignee: RCA Corporation, New York, N.Y.

[21] Appl. No.: 888,931

[22] Filed: Mar. 22, 1978

[51] Int. Cl.[2] ........................ G06F 15/34; G06G 7/12

[52] U.S. Cl. .................................... 364/726; 364/827

[58] Field of Search .............. 364/726, 827; 324/77 B, 324/77 D, 77 G, 77 H

[56] References Cited

U.S. PATENT DOCUMENTS

| | | | |
|---|---|---|---|
| 3,926,367 | 12/1975 | Bond et al. .................... | 324/77 G X |
| 3,965,343 | 6/1976 | Speiser et al. ........................ | 364/726 |

*Primary Examiner*—David H. Malzahn

*Attorney, Agent, or Firm*—H. Christoffersen; Samuel Cohen; Donald W. Phillion

[57] ABSTRACT

P-point transform analyzer using M N-point serial transform devices in parallel, the output signals therefrom being combined in K J-point serial transform devices in parallel, where M, N, K, and J are integers other than one such that $M \times N = K \times J = P$. Serial input signals are converted to M parallel sets of signals which are coupled to the N-point transform devices for processing in subgroups. The subgroups of output signals are combined into the proper order by switching the output signals from the N-point devices to the J-point devices after suitable delays and phase shifting.

7 Claims, 9 Drawing Figures

PARALLEL TRANSFER ANALYZER FOR PERFORMING THE CHIRP Z TRANSFORM

This invention relates to apparatus and method embodying complex arithmetical operations for performing the chirp Z-Transform.

The chirp Z-Transform (CZT) converts a periodically-sampled signal into its frequency components. It is based on a derivation from the discrete Fourier transform (DFT) and has the advantage that it can be implemented using convolvers and complex multipliers.

A transform network is designed to handle a given integral number of samples per cycle, designated as P. When P is an integral power of two, the network is most easily implemented. The resulting number of frequency components is also P so that more sample points are required as the number of frequency components of interest increase. As P increases, however, the complexity of the transform device also increases.

The problems of constructing a transform network for large values of P can be reduced by modularizing the network, using several simpler transform devices in parallel. An example of this approach is shown in U.S. Pat. No. 3,965,343. A plurality of $N_2$ CZT devices, each handling $N_1$ samples, have their output signals combined in an $N_2$-point parallel DFT. The input signals are multiplexed to the CZT input terminals. Such a system can handle $P=N_1N_2$ samples. A disadvantage of such a modular system is that the $N_2$-point parallel DFT itself becomes more complex as $N_2$ increases.

To process according to the invention a P-point transform of P input sample signals, which are sampled at a rate of $1/\tau$, the input signals are decomposed into M sets of sample signals having a virtual sample rate of $1/M\tau$. Each of the M sets of sample signals are then transformed by an N-point transform process to M sets of result signals. The phase of the result signals is shifted to correct for time domain time shift of the corresponding input signals to produce K sets of corrected signals, each set of corrected signals being then transformed by a J-point transform process to produce the P-point transform. The values of J, K, M, N, and P are integers, where $P=M\times N=J\times K$.

Figure 2:
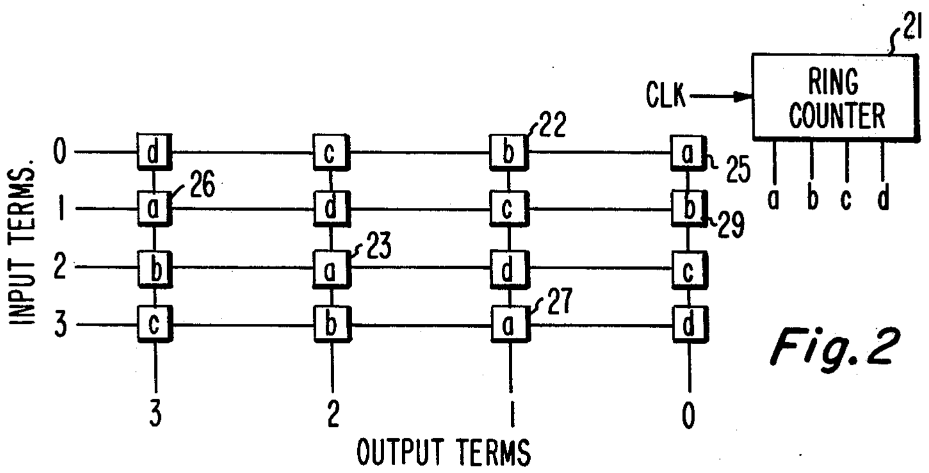
FIG. 2 is a schematic of a 4-to-4 barrel switch.
Figure 3A:
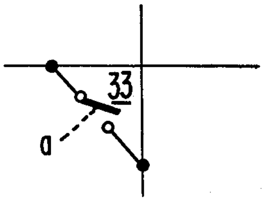
Figure 3B:
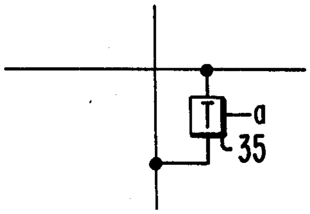
Figure 5:
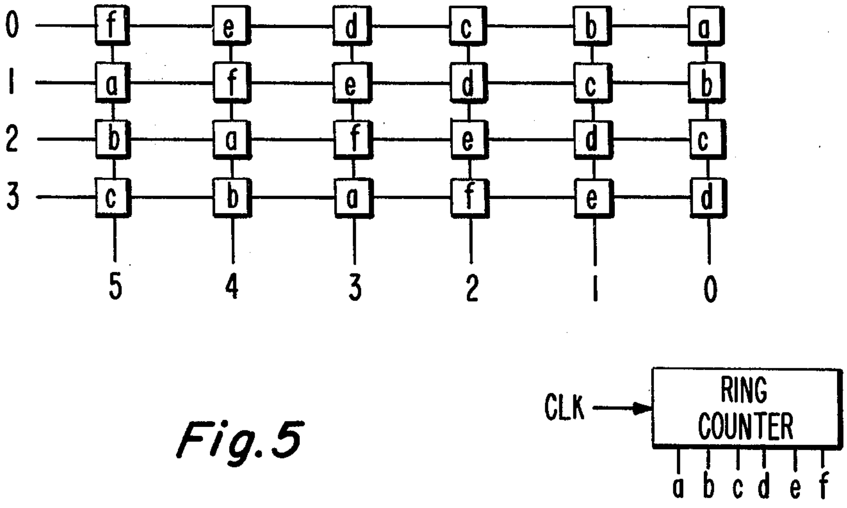
Figure 4:
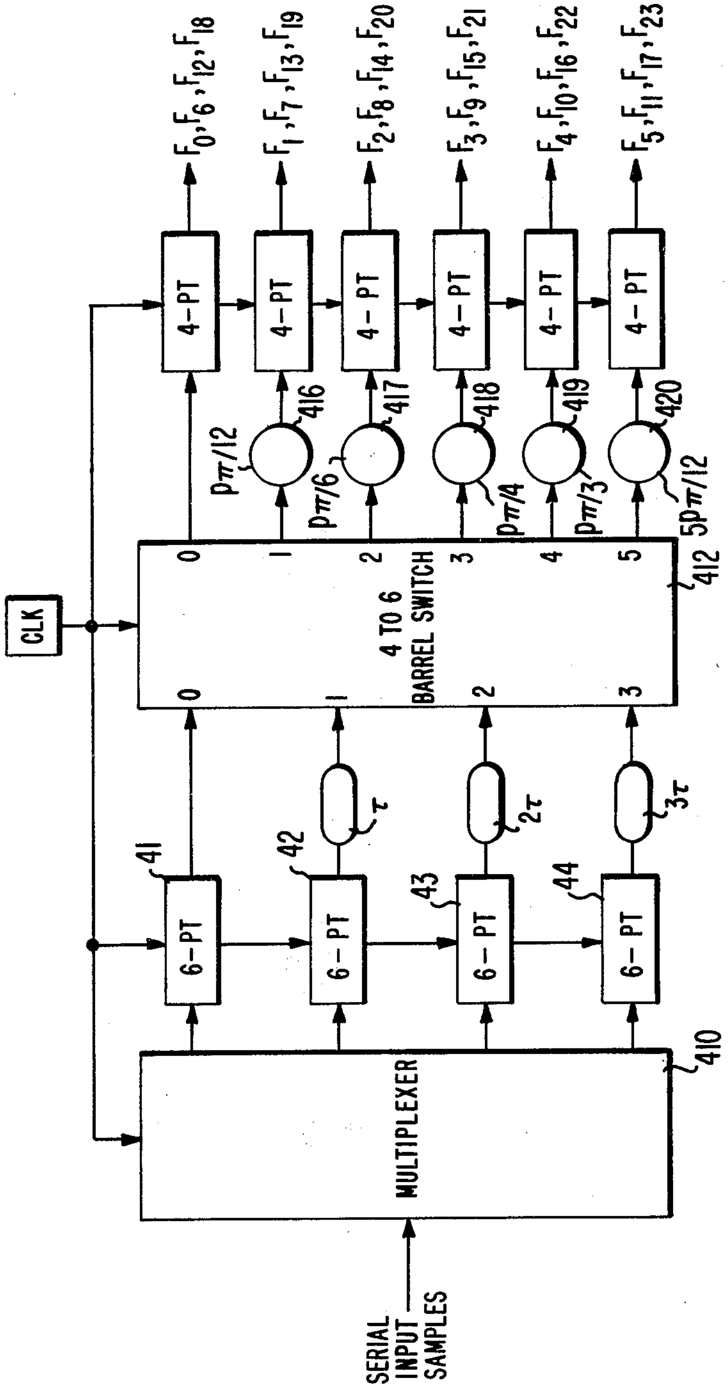
Figure 6:
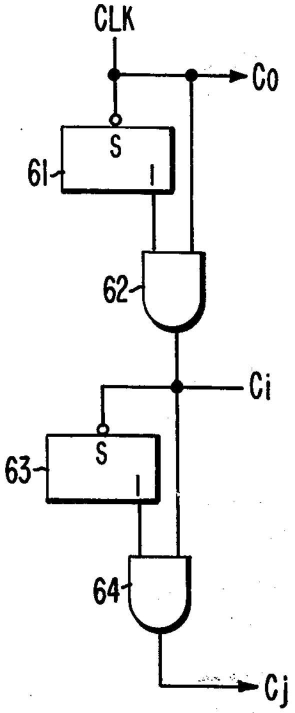
Figure 7:
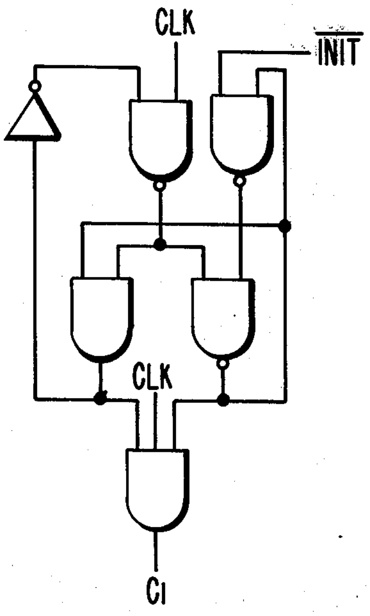

FIGS. 3(*a*) and 3(*b*) are illustrations of the switch connections shown symbolically in FIGS. 2 and 5;

FIG. 4 is a block diagram of a system embodying the invention in which $M=4$, $N=6$, $K=6$, and $J=4$ for processing a 24-point transform;

FIG. 5 is a schematic of a 4-to-6 barrel switch;

FIG. 6 is a logic diagram of a clock pulse sequencer;

FIG. 7 is a logic diagram of an alternate clock sequencer; and

Figure 8:
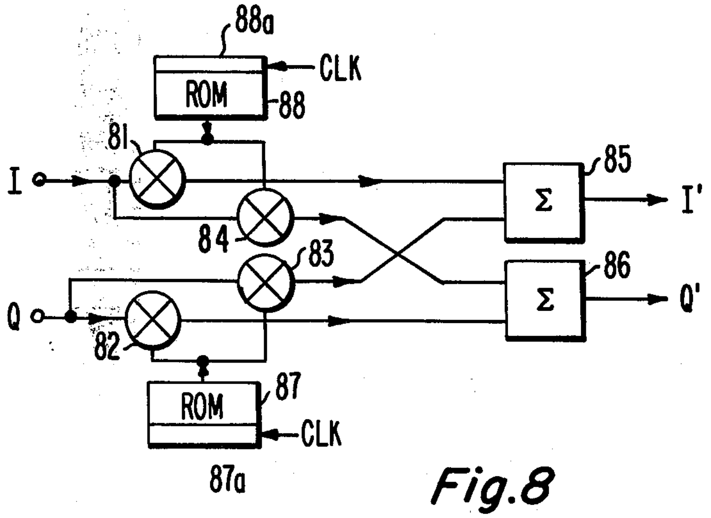

FIG. 8 is a block diagram of a complex multiplier or phase shifter.

In the following description, the expression "discrete signals" is intended to be generic to both sampled analog values and digital values, which may comprise several bits in parallel. Implementations of the discrete Fourier transform, such as the chirp Z-transform of the Fast Fourier Transform (FFT), are structured for a predetermined number of samples per cycle, also called points per cycle. A characteristic of the FFT is that it is especially useful when the number of points is equal to an integral power of two. The CZT on the other hand can be implemented for any number of points, but is usually designed for an even number of points. Since the complexity of the networks required to generate the transform increases rapidly as the number of points increase, large values of P (the number of points per cycle) require expensive networks or devices which are not as readily available as transform devices for small values of P. Therefore, it is desirable to decompose a system for a large value of P into subsystems, each handling fewer points, and then to combine their output signals using subsystems to provide the transform output signals to eliminate the P/2 DFT device required in the prior art.

Figure 1:
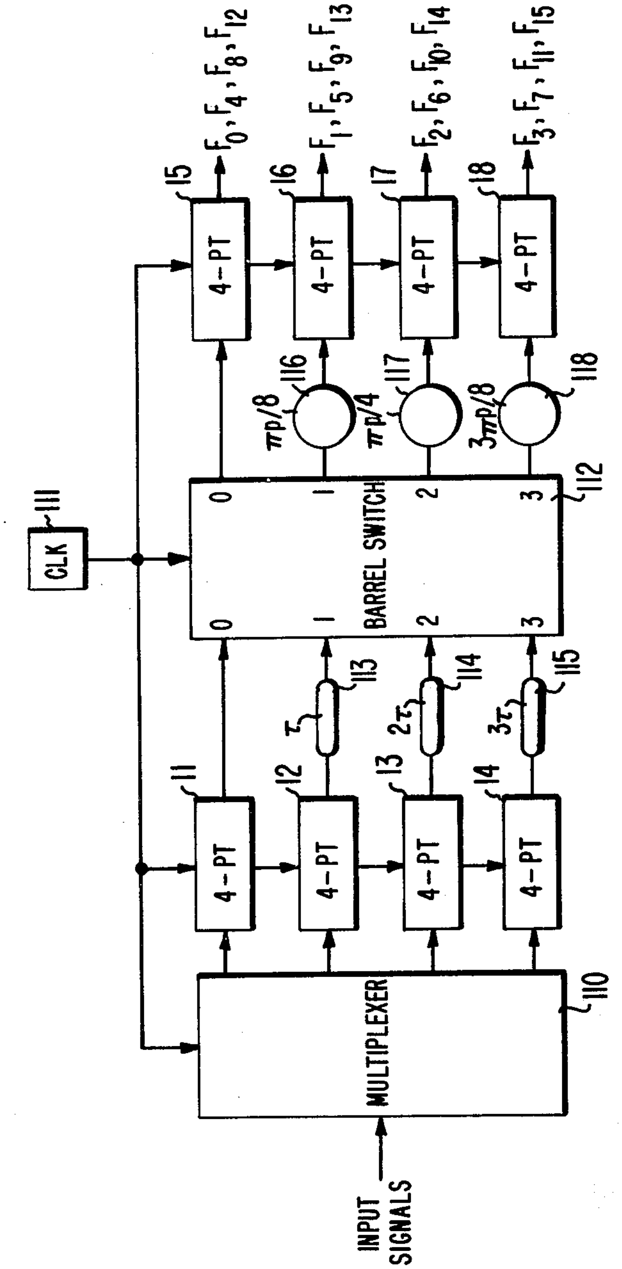
FIG. 1 is a block diagram of a system embodying the invention in which $M=N=K=J=4$ for processing a 16-point transform.

The system shown in FIG. 1 is a transform network structured only from parallel transform devices. For purposes of discussion, the transform devices are considered to be CZT devices although other serially organized transform devices can be used. A modular approach uses small size, lower-cost devices which are not commercially available for large values of P. For example, 512-point devices are available but not 4096-point devices. The transform devices 11–18 are shown as 4-point CZT CCD devices for clarity of explanation; the devices could be 512-point devices such as the Reticon Charge Coupled Device R5601 which is a monolithic integrated circuit containing two 512-stage (point) charge-coupled devices (CCD's) for implementing the chirp Z-transform algorithm. The use of this device is detailed in the data sheet available from the manufacturer (Reticon Corporation). See also *Computer Design*, January 1978, p. 156, and G. J. Mayer, "The Chirp Z-Transform—A CCD Implementation" *RCA Review*, Vol. 36, December 1975, pp. 759–773. The Speiser et al. patent supra also contains an explanation of the chirp Z-Transform apparatus.

A clock 111 produces timing signals which have a period equal to the interval between the input sample signals. The clock synchronizes the operation of the various system components. The clock can be implemented as an oscillator, free-running multivibrator, or be a part of the sampling system providing the input signals. Such clock sources are well known in the art.

A multiplexer 110 receives the serial input sample signals and couples each group of four sequential signals, in parallel, to the transform devices 11–14. The multiplexer 110 could be implemented by a serial-to-parallel shift register having M stages, where M is the number of transform devices in the first plurality of transform devices 11–14. In this example, M has a value of four. The number of points per device in the first plurality of networks is designated as N; in this example N has a value of four. If the discrete input samples are analog signals, the multiplexer can be implemented with a CCD shift register.

In an alternative approach, the output signals from the multiplexer 110 need not be in parallel. Instead, the system may be implemented by coupling the first output signal to the transform device 11, the second, to the transform device 12 and so on, the M-th input signal being coupled to the M-th transform device, in this example, the transform device 14. The M+1-th sample is then coupled to the transform device 11 and so on, the 2M-th sample being coupled to the M-th device. In other words, the samples are coupled to the devices cyclically in sequence, modulo-M. If the output signals from the multiplexer 110 are not in parallel, the timing signals to the transform devices must be modified as will be pointed out in more detail below.

In still another alternative approach, the multiplexer 110 may contain a sample and hold circuit (rather than a serial-to-parallel shift register as previously discussed) in order to couple the output signals to the transform devices in parallel.

The effect of decomposing the input signals into M parallel groups, is equivalent to sampling a signal at a period of $M\tau$ where $\tau$ is the actual sampling period. In the time domain, the input cycle over which the samples are taken is a period T, which is divided into MxN, or sixteen sampling periods in the example. The number of points, P, are MxN. Therefore, the transform device 11 processes samples 0, 4, 8, and 12, the samples being zero-indexed. Similarly, the device 12 processes the points 1, 5, 9, 13; device 13, points 2, 6, 10, and 14; and device 14, points 3, 7, 11, and 15. The number of points P, is equal to $T/\tau$, or $\tau=T/P$.

In the frequency domain, the output signals from the transform devices represent ordinate values along an abscissa axis $1/\tau$, the ordinate amplitude being related to integral values of frequency, namely n/T, where $n=0,1,2,\ldots,N-1$. The output signals from the transform devices 11–14 represent frequency components from n=0 to n=3 of a waveform sampled at a rate of $1/M\tau$. Because of the time shift between the sample signals coupled to successive transform devices 11–14, the output signals exhibit phase shifts in the frequency domain corresponding to the time shift of the input sample in the time domain. Therefore, the recombination of signals from the transform devices 11–14 to produce the proper transform result must account for the phase shift thus produced.

The output signals from the transform devices 11–14 are coupled to the input terminals of a barrel switch 112. The transform device 12 is coupled to the barrel switch 112 through a delay element 113 having a delay interval of $\tau$, the transform device 13 is coupled to the barrel switch 112 through a delay element 114 having a delay interval of $2\tau$, and the transform device 14 is coupled via a delay element 115 having a delay interval of $3\tau$. These delay elements can be analog type shift registers using CCD techniques, delay lines, or digital shift registers in the case of digital signals. The delay elements are required if the multiplexer 110 couples the input signals to the transform devices 11–14 in parallel. If the multiplexer output signals occur serially in time, the delay elements 113–115 are not required but the clock signal to successive transform devices must be delayed by successive $\tau$ intervals.

The barrel switch 112 in FIG. 1 has four input terminals and four output terminals. In general, the barrel switch has M input terminals and K output terminals, where K is not necessarily equal to M. The value of K is the number of transform devices in the second plurality 15–18 of transform devices and J is the number of points per transform device. In the system illustrated in FIG. 1, K and J are equal to 4. It is a necessary condition that $M\times N=K\times J$, which are equal to P. The input and output terminals of the barrel switch 112 are ordered and zero-indexed. The barrel switch cyclically couples each input terminal to an output terminal in such a fashion that each input terminal is coupled to successively higher ordered input terminals, modulo-K. Initially, the input terminal 0 is coupled to the output terminal 0, the input terminal 1 to output terminal 3, the input terminal 2 to output terminal 2, and input terminal

3 to ouput terminal 1. Following a clock pulse, input terminal 0 is coupled to output terminal 1, input terminal 1 is coupled to output terminal 9, input terminal 2 is coupled to output terminal 3, and input terminal 3 is coupled to output terminal 2. After another clock pulse, input terminal 0 is coupled to output terminal 2, input terminal 1 to output terminal 1, input terminal 2 to output terminal 0, and input terminal 3 to output terminal 3. Thus, each clock pulse or interval of $\tau$ switches each of the input terminals to a higher ordered output terminal, modulo-K. In general, k(m,p), the output terminal coupled to input terminal m after p timing pulses, is given by $k(m,p)=(p-m)\bmod K$, where $m=0,1,\ldots,M-1$, $k=0,1,\ldots,K-1$, and $p=0,1,\ldots,P-1$.

FIG. 2 illustrates an implementation of the barrel switch 112. In FIG. 2, the input terminals are shown as row numbers and the output terminals are shown for convenience as column numbers in reverse order. Each junction of an input line with an output line is controlled by a switching element symbolized by a square, e.g., element 23, in which a lower case letter indicates a control signal input. A ring counter 21 is responsive to the clock signals for producing in succession one of the output control signals, a, b, c, or d. Ring counters are well known in the art and need not be described in detail, the important fact being that only one output control line at a time is activated, in sequence by successive clock pulses.

Examples of switching element implementations are shown in FIGS. 3(*a*) and 3(*b*). In FIG. 3(*a*), a switch 33 couples a horizontal input line to a vertical output line when activated by a control signal a; this could be incorporated as a relay. In FIG. 3(*b*), a transmission gate 35 is arranged to couple a horizontal and vertical line in response to a control signal a.

Returning to FIG. 2, when the control signal a is high, input terminal 0 is coupled to output terminal 0 via the switch element 25, the input terminal 1 to output terminal 3 via the switch element 26, the input terminal 2 to the output terminal 2 via the switch element 23, and the input terminal 3 to the output terminal 1 via the switch element 27. When the ring counter output signal b is activated, the input terminal 0 is coupled to the output terminal 1 via the switch element 22, input terminal 1 is connected to output terminal 0 via the switch element 29, and so on.

In FIG. 1, the phase shift corrections are effected by the complex multipliers 116–118. The value inside the symbol, such as $\pi p/8$ in the phase shifter 116, represents multiplication by $\exp(-j\pi p/8)$. In general, for P points, the complex multiplier is given by $\exp(-j2\pi kp/P)$ where k is the output terminal of the barrel switch 112 supplying the multiplicand and p represents the p-th interval. Since $2\pi/P$ is a constant, it will be represented by W.

Complex signals, such as those used in the transform devices, comprise an In-phase signal, I, and a Quadrature-phase signal, Q, i.e., I+jQ. Complex multiplication of signal values is based on Eulers relation, $\exp(-jx)=\cos x-j\sin x$. Therefore, $$(I+jQ)\exp(-jWpk)=I'+jQ'$$
$$\begin{aligned}I'+jQ' &= (I+jQ)(\cos Wpk - j\sin Wpk)\\ &= (I\cos Wpk + Q\sin Wpk)\\ &\quad + j(Q\cos Wpk - I\sin Wpk)\end{aligned}$$

The first term in parenthesis is the value of I′, and the second term in parenthesis is the value of Q′.

The implementation of the above multiplication using state-of-the-art devices is shown in FIG. 8 where devices 81–84 are standard multipliers and devices 85 and 86 are standard adders. The adder 86 is coupled to subtract the product of the multiplier 84 from the product of the multiplier 82. The products from the multipliers 81 and 83 are added in the adder 85. The adder output signals are the complex components in the frequency domain shifted by a predetermined phase.

The values of the sine and cosine terms are provided by read-only memories (ROM's) 87 and 88, respectively. The input addresses can be supplied by counters 87*a* and 88*a* which are incremented by the clock signals. The output signals from the ROM 87*a* represent the value of sin Wpk and the signals from the ROM 88, the value of cos Wpk.

Alternatively, the ROM's 87 and 88 could be replaced by feedback-coupled CCD shift registers that circulate the values to the multipliers.

The operation of the system of FIG. 1 will now be described in detail. Discrete input sample signals are applied serially to the multiplexer 110. Every fourth input signal is coupled to the same transform device 11–14. The signals applied to each transform device are processed as if they represented P/4-point signals, sampled at a rate of $\frac{1}{4}\tau$.

If the multiplexer 110 supplies the input signals to the input terminals of the transform devices 11–14 in parallel, then the output signals from the transform devices 12–14 must be delayed by $\tau$, $2\tau$, and $3\tau$, respectively, in the delay devices 113–115.

The first output signals from the transform devices 11–14 represent input signals that are not shifted in time. During the first four clock periods these output signals are coupled successively to the output terminal 0 of the barrel switch 112. Barrel switch output terminal 0 is coupled directly to the input terminal of the transform device 15, there being no phase shift correction required in these first four signals.

The second output signal from each of the transform devices 11–14 represent the result signals shifted a $\tau$ interval of time. The operation of the barrel switch couples each of these in turn to the transform device 16 through the phase shifter 116, which corrects the phase shift in the frequency domain to compensate for the time shift in the time domain.

Similarly, the third and fourth groups of signals are coupled to the transform devices 17 and 18 through the phase shifters 117 and 118, which compensate for the $2\tau$ and $3\tau$ time shift in the respective groups of input signals.

The output signals from the transform devices 15–18 represent the frequency components of the input signals. These frequency domain output signals are in cyclic order, i.e., the first frequency component is the first output signal from the transform device 15, the second frequency component is the first output signal from the transform device 16, and so on.

The network of FIG. 1 represents a 16-point transform device where the values of M, N, K, and J are four. In FIG. 4, a 24-point transform device is illustrated where M=4 and N=6, K=6 and J=4. The barrel switch 412 for this implementation is illustrated in FIG. 5 and operates according to the same general principle as that described above for the barrel switch 112 in FIG. 1. The multiplexer 410 separates the signals into four channels to the transform devices 41–44. The phase shift devices 416–420 perform the same function as described above; only the phase shift values are different.

As stated previously, the multiplexer 110 in FIG. 1 and the multiplexer 410 in FIG. 4 need not supply the input sample signals in parallel to the first group of transform devices. If the multiplexers gate the input signal to each transform device in succession, it may be necessary to delay the input clock to successively higher order transform devices such as 11–14 in FIG. 1. The circuit of FIG. 6 illustrates an embodiment of a clock-delaying circuit or clock pulse sequencer which can be considered to be included in the transform devices themselves. FIG. 6 illustrates two successive stages, each stage being included in a separate transform device. Each stage comprises a triggerable (or toggle) flip-flop and an AND gate. The toggle flip-flop 61, which changes state at the negative-going edge of the input signal, has its set output signal coupled to an AND gate 62. The other input of the AND gate 62 is coupled to the input signal; in the first stage this signal is the clock. Initially, all the flip-flops are reset. The output signal from the AND gate 62 is the input clock signal to the following transform device. The next stage, comprising the flip-flop 63 and the AND gate 64 produce a clock signal to the next transform device. Successive stages can be added for each transform device as required.

When the input signal first occurs, the flip-flop 61 is reset so that the AND gate 62 is not activated. At the end of a clock pulse signal, the negative-going edge of the signal toggles the flip-flop 61 to the set condition, the set output signal priming the AND gate 62. When the clock or input signal occurs subsequently, the flip-flop 61 and the clock signal provide the input signals that activate the AND gate 62, thereafter providing a chain of timing signals in step with the original clock signals. When cascading two stages, the first output signal from the AND gate 64 occurs after two input clock signals have occurred, the first clock signal setting the first stage and the second setting the second stage via the AND gate 62. The clock pulse sequencers are initialized by resetting the flip-flops.

FIG. 7 illustrates a combinatorial logic implementation of a clock pulse sequencer for each stage. Its operation is straightforward and need not be explained in detail.

A complete and general description of a transform network for processing a P-point transform using in parallel transform devices that can handle only a fraction of P points. has been provided. In addition to the advantages stated above, such a system has the important added advantage of decomposing the speed of operation as well as the size of devices. For example if each transform device can handle input signals at a maximum sampling frequency, F, the networks according to the invention can handle sampling frequencies of MF, or JF if J<M.

What is claimed is:

1. In a system including a first plurality of M N-point transform means, where M and N are integers other than one such that M×N=P, each having input means, for producing output signals representative of the transform of signals applied to said input means, multiplexer means coupled to receive serial input signals representative of discrete sample values for cyclically coupling said input signals ad seriatim to the input means of successive separate ones of said first plurality of transform means, and means for supplying clocking pulses having a period equal to the time interval between successive input signals, the improvement comprising:

switching means having M ordered input terminals designated m=0, 1, . . . ,M−1 and K ordered output terminals designated k=0, 1, . . . ,K−1 for coupling, in response to said clocking pulses, each input terminal to each output terminal in cyclic order such that k(m,p)=(p−m)mod K where p represents the interval between the p-th and the (p+1)-th clocking pulse in a cycle, designated p=0, 1, . . . ,P−1, and k(m,p) designates the output terminal coupled to the m-th input terminal during the p-th interval;

coupling means for coupling the output signals from each of the first plurality of transform means to a separate one of the input terminals of said switching means;

a second plurality of K J-point transform means, where K and J are integers other than one such that K×J=P for producing at their output terminals, in cyclic order, signals representative of successive terms of P-point transform;

a plurality of K−1 complex multiplier means for coupling each of the output terminals, except the first, of the switching means to a separate one of said second plurality except one of transform means, each complex multiplier means providing a different valued phase shift; and means for coupling the first output terminal of the switching means to said excepted one of the second plurality of transform means.

2. The invention as claimed in claim 1 wherein said multiplexer means including means for coupling the input signals in parallel to the input means of successive separate ones of said first plurality of transform means and wherein said coupling means includes a plurality of M−1 delay means, each having a delay interval equal to a successively higher integral multiple of the period of said clocking pulses for coupling the output signals from each except the first of said first plurality of transform means to a separate input terminal of said switching means.

3. The invention as claimed in claims 1 or 2 wherein said switching means includes timing means responsive to said clocking pulses for producing cycles of K timing pulses in succession, a plurality of M×K selective coupling means, each disjoint subset of M coupling means being responsive to a different one of said K timing pulses, for selectively coupling each input terminal to each output terminal.

4. The invention as claimed in claim 3 wherein each coupling means includes transmission gate means.

5. The invention as claimed in claims 1 or 2 wherein said transform means comprise chirp Z-Transform means.

6. A method for producing a P-point transform of P input sample signals, designated p=0, 1, . . . ,P−1, sampled at a rate of $1/\tau$, comprising the steps of:

decomposing the input signals into M sets of sample signals having a virtual sample rate of M/t;

transforming each of said M sets of sample signals by N-point transform process, where M×N=P, to produce M sets of intermediate results;

shifting the phase of the result signals to correct for time domain time shift of the corresponding input signals to produce K sets of corrected signals; and transforming each of said K sets of corrected signals by J-point transform process, where K×J=P, to produce said P-point transform, K, J, M, N, and P being integers.

7. The method claimed in claim 6 wherein said shifting step includes shifting, by a k-th value designated K=0, 1, . . . ,K−1, the p-th result from the m-th set of intermediate results designated m=0, 1, . . . ,M−1, such that k(m,p)=(p−m)mod K.

* * * * *

UNITED STATES PATENT AND TRADEMARK OFFICE
CERTIFICATE OF CORRECTION

PATENT NO. : 4,159,528

DATED : June 26, 1979

INVENTOR(S) : Richard Prather Perry

It is certified that error appears in the above-identified patent and that said Letters Patent is hereby corrected as shown below:

Column 4, line 3, change "9" to -- 0 --;
line 13, change "(p-m)" to -- (m-p) --;

Column 8, line 21, change "m/t" to -- m/τ --.

Signed and Sealed this

*Eighth* Day of *July 1980*

[SEAL]

*Attest:*

SIDNEY A. DIAMOND

*Attesting Officer* *Commissioner of Patents and Trademarks*